Patented July 9, 1940

2,207,299

UNITED STATES PATENT OFFICE 2,207,299

JELLY AND JELLY MANUFACTURE

Nathan M. Mnookin, Kansas City, Mo., assignor to Speas Company, a corporation of Missouri No Drawing. Application April 19, 1938, Serial No. 202,878

16 Claims. (Cl. 99—132)

This invention relates to jelly manufacture and more particularly to the manufacture of jellies by means of pectin bodies other than pectinates and soluble pectin, and more particularly by means of pectate salts, and which jellies are not controlled by sugar content as are pectin jellies and hence are capable of forming sugarless or low-sugar content jellies.

In the prior art methods of making jams and jellies, soluble pectin, either naturally contained in the fruit juices used or added, is relied upon as the jelly-forming agent. As is recognized in the prior art, soluble pectin does not produce a jell except in the presence of acid and of a definite concentration of sugar or of certain polyhydric alcohols in the aqueous medium. The minimum concentration of sugar in solution necessary to form a jell with soluble pectin and acid is about 46% when about 2% of acid (as tartaric) is present. Higher concentrations of sugar in solution, in the order of about 65% and slightly higher, are, however, generally used to form a jell with soluble pectin and acid. In these instances the quantity of acid used may be decreased to the order of about 0.2 to 0.1% and slightly lower. With concentrations of sugar and acid in the order set forth above, soluble pectin in the order of about 0.2 to 1% is the usual amount optimum for jelly production, the proportion being dependent on the jelly grade.

In accordance with the present invention I have found that pectin substances or bodies other than soluble pectin can be used in lieu of the pectin to form jams or jellies. Thus, in accordance with my present invention I have formed jellies with the aid of pectic acid or of its water-soluble and water-insoluble salts. Moreover, in accordance with my invention, I can produce jellies without being limited in so doing by the proportion of sugar present. Hence, while I am able to produce jellies having proportions of sugar commensurate with those in jellies as ordinarily produced with pectin, I am also able to produce jellies containing no sugar or polyhydric alcohols, or only small amounts thereof, for example, of sugar in the order of from about 5% upwardly, say from 0 to 40%, as desired. The quantity of acid which is present in the jell-forming mix in accordance with my invention may vary, as before, from about 0.1 to 0.2% up to about 2% and higher depending on the quantities of the other ingredients used.

The pectic body, pectic acid, used in accordance with my invention may be obtained by the methods known for the formation of pectic acid. Thus, the insoluble pectose present in apples, lemons, oranges, grapes, carrots, beets, turnips, jute, wood, and the like may be hydrolyzed to pectin by an acid treatment or by the methods commonly used for the purpose, the pectin separated and then converted into pectic bodies by further treatment with an alkali or alkaline salt. The conversion is almost instantaneous, and, naturally, is dependent to a great extent on the quantity, nature and strength of the alkali or alkaline salt used. If desired, the pectate salt can be formed directly from the insoluble pectose by hydrolyzing the latter under weak alkaline conditions. In either event, the pectic acid may be precipitated from the aqueous solution upon the addition of an acid in a manner well-known in the art. The precipitated pectic acid is then removed, and is washed, purified and dried and thereby made ready for use. Pectic acid may also be secured directly from certain vegetable products in which it is found as such; for example, in artichoke and dahlia tubes, turnip, sugar beets, etc.

The pectic bodies such as the water-soluble and water-insoluble pectates used in accordance with my invention may be obtained by reacting, in a known manner, pectic acid with compounds capable of forming the desired water-soluble and water-insoluble pectates, as well as by any other method. Thus, water-soluble pectic bodies may be obtained by reacting pectic acid with, for example, ammonia and ammonium compounds, sodium carbonate, potassium carbonate and like alkali metal compounds, urea, aniline, the alkaline organic ammonium compounds such as mono-, di- and tri-ethanolamine, ethylene diamine and like alkylene polyamines, hexamethylenetetramine, alkaline-protein derivatives, and the like. The water-insoluble pectic bodies may be obtained by reacting pectic acid or a water-soluble pectate with a precipitating water-soluble salt of a metal, for example, the water-soluble salts of calcium, magnesium and the like and preferably the water-soluble calcium salts such as calcium acetate, calcium lactate and the like.

The various pectic bodies referred to above, regardless of the method or methods of making the same, may be used in the processes of making jellies in accordance with my invention as hereinafter described.

In carrying out the present invention I produce a jelly by effecting a dispersion in an aqueous medium of an insoluble metallic pectate, and preferably an alkaline earth metal pectate. For edible products it is preferable that calcium pectate be utilized. The insoluble metal pectate which forms the jell structure may be formed by using pectic acid or soluble pectates and causing their reaction with a metal salt, the metal ion of which forms an insoluble pectate, preferably in the presence of suitable dispersing agent; or it may be formed by direct incorporation of calcium or other insoluble pectate in the presence of suitable dispersing agents. The compounds capable of acting as dispersing agents in forming jellies according to the present invention are in general alkali metal (including NH4) salts of weak acids, such as sodium or ammonium citrate or tartrate, lactate or hexametaphosphates or mixtures thereof, and may be used as such or may be formed in the jelly-producing mixture, as by reaction of the corresponding acids and alkalis. The dispersing agents so used appear to have a partial solvent action on the insoluble pectate, aiding in forming the gel structure.

I have found that the presence of sugar, or of sugar and acid in certain definite proportions, is not necessary to the formation of jellies according to the present invention, although sugar may be incorporated to a substantial extent, if desired. Hence, by the present invention I am able to produce jellies which are free from sugar, or which contain sugar in proportions lower than those possible in pectin jellies, if desired, as well as jellies of a sugar content comparable with those produced with pectin. Larger proportions of sugar are, however, not desirable in jellies produced according to the present invention.

The proportion of the alkali salt acting as the dispersing agent may vary relative to the proportion of pectate present. Free acid may also be present, but not in substantial excess; and if present, as when acid fruit juices are used in producing the jellies according to the present invention, alkali should be added to effect the neutralization of the greater part of the acid.

In preparing jellies in accordance with the present invention, the ingredients may be incorporated in the aqueous vehicle to form a gel structure, or may be separately dissolved to form non-jelling solutions which, on admixture, even in the cold, form a jelly. In commercial distribution, it is desirable to incorporate the gel-forming ingredients into a dry mixture, which may be distributed and sold as such, to be incorporated by the purchaser into the final jelly, using such fruit juices, or other materials such as milk, or water, with flavoring materials, sweetening agents, etc. as desired.

Thus, in carrying out the invention, I may prepare a dry mix containing a water-insoluble metallic pectate, preferably an alkaline earth metal pectate, add the dry mix to a requisite amount of water or fruit juice, bring the mixture to a boil and cool to form a jell. The dry mix, in addition to the insoluble pectate, contains a salt or salts capable of dispersing or dissolving the insoluble pectate in the aqueous medium and an acid. The acid may be omitted in the instance where the mix is added to a fruit juice containing sufficient acid. If desired, any desired amount of sugar may be incorporated therewith although this is not essential.

The water-insoluble metallic pectates used in accordance with my invention may be suitably magnesium pectate or other insoluble metal pectate and preferably calcium pectate. The dispersing or dissolving agent may be suitably an alkaline metal (including NH4) salt of a weak acid, such as sodium citrate, ammonium citrate, the corresponding tartrates, lactates or the like, hexametaphosphates, sodium di-ammonium phosphate, potassium ammonium phosphate and the like, or mixtures thereof. The acids may be suitably food acids such as citric, tartaric, malic and the like or juices containing a food acid such as lemon juce or the juice of unripe apples and the like or any mixture thereof, however, any suitable acid may be employed.

The quantity of ingredients in the dry mix may vary rather widely. Thus, satisfactory results have been obtained by combining with about 0.25 to about 2.0 parts by weight of the water-insoluble pectate, about 0.1 to about 1.75 parts by weight of the dispersing agent or agents and about 0.2 to 0.3 and up to about 1.3 parts by weight of the acid. Sugar may be entirely omitted from the mix although, if desired, up to about 40 parts by weight of sugar and higher may be incorporated in the dry mix. A typical formula illustrating the use of an insoluble pectate in a dry mix employed in accordance with my invention is as follows. In this and other examples disclosed herein, the term "parts" means parts by weight.

|  | Parts |
|---|---|
| Calcium pectate | 1 |
| Sodium citrate | 1.5 |
| Sodium hexametaphosphate | 0.2 |
| Tartaric acid | 0.2 |

In utilizing a dry mix containing a pectic body such as a water-soluble pectate in accordance with my invention, the water-soluble pectate is combined with a water-soluble metal salt, preferably a water-soluble alkaline earth metal salt, capable of forming an insoluble pectate with the soluble pectate during the jelly making process, a salt capable of dispersing or dissolving the insoluble pectate, and an acid, and sugar, if desired, as described above. Satisfactory results have been obtained by combining with about 0.25 to about 2.0 parts by weight of water-soluble pectate, about 0.1 to about 0.4 part by weight and higher of the water-soluble alkaline-earth salt, about 0.1 to about 1.75 and higher of the salt or salts capable of dispersing or dissolving the insoluble alkaline-earth pectate, about 0.2 to 0.3 and up to about 1.3 parts by weight and higher of the acid and from 0 to 50 parts by weight of sugar and higher. A typical formula illustrating the use of a water-soluble pectate, for example, sodium pectate, ammonium pectate, an organic amine pectate and the like in a dry mix to prepare a jelly in accordance with my invention is as follows:

|  | Parts |
|---|---|
| Ammonium pectate | 0.5 to 1.0 |
| Sodium citrate | 1.0 to 1.5 |
| Citric acid | 0.2 to 0.3 |
| Calcium lactate | 0.4 |

Jellies may be also made in accordance with my invention with the pectic body, pectic acid. A typical formula illustrating the use of pectic acid in a dry mix in accordance with my invention is as follows:

|  | Parts |
|---|---|
| Pectic acid | 1.0 |
| Sodium carbonate | 0.9 |
| Citric acid | 1.3 |
| Calcium carbonate | 0.1 |
| Ammonium citrate | 0.2 |
| Potassium ammonium phosphate | 0.2 |

The quantity of ingredients in the above dry mix may also vary rather widely. In general and in respect of the pectic acid, equivalent or stoichiometrical amounts of the sodium carbonate or other compound capable of forming a water-soluble pectate, and of the calcium carbonate or other water-soluble metallic salt capable of forming a water-insoluble pectate with the water-soluble pectate are used. Satisfactory results have been obtained by combining with about 1.0 part by weight of pectic acid, about 0.5 to about 1.5 parts by weight of the compound capable of forming a water-soluble pectate, about 0.05 to about 0.4 part by weight and higher of the water-soluble metallic salt, about 0.1 to about 1.5 parts by weight and higher of the salt capable of dispersing or dissolving the insoluble pectate formed during the jelly making process, about 0.2 to 1.0 and up to about 1.3 parts by weight and higher of the acid and from 0 to 40 parts by weight of sugar and higher.

In producing jellies with a dry mix in accordance with my invention, the powder mix, either without, or with any desired amount of sugar up to about 40 to 50 parts by weight and higher, is stirred into about 100 parts by weight of water or fruit juice and the mixture brought to a boil and held until solution is effected. The solution may then be poured into a mold and permitted to cool until a jelly results. In general, the jellies formed with a pectic body in accordance with my invention are resilient and clear and are not as sensitive to temperature changes as are those of the gelatine or Jello-type. The jellies produced in accordance with my invention will hold their shape under normal weather conditions without the necessity of being kept cool as with the prior art jellies. While cooling to maintain the shape of the jelly is desirable, it is not essential. The jellies are odorless and may be readily removed from the mold without further heating and/or cooling. These jellies may be compounded with coloring and flavoring materials in the same manner as now employed with gelatin desserts.

By controlling the quantity of sugar used in forming jellies in accordance with my invention it is possible to obtain a high-sugar or low-sugar or sugarless jelly to meet any desired need. The quantity of insoluble pectate used in the jelly making process, whether included as such in the dry mix or formed during the process, and particularly the metal and the content thereof, and the quantity of salt capable of dissolving or dispersing the insoluble pectate modify the nature of the jell, its strength, and time of set and thus jellies of variable texture and strength can be had by controlling and modifying the quantities and character of the ingredients used. In general, the calcium or other metal content determines the smoothness of the jell, and if used excessively a graininess in the jelly results; if used in insufficient amounts, a semi-viscous liquid results. The quantity of the salt capable of dispersing or dissolving the insoluble pectate used in the mix or formed during the jelly making process affects the time of set, the resilience of the jell and intensifies the strength thereof. The soluble hexametaphosphate additionally tends to impart an improved clarity to the jell.

In connection with the control of the jelly-forming characteristics of a product, it may be noted that increase in proportions of pectic acid or soluble pectate, or of calcium salts, or of sugar (if used) or of acid increases gel-formation, accelerating the production of jellies or increasing the firmness of the jelly, whereas the salts employed as dispersing or dissolving agents act in the reverse direction. Thus, in controlling the characteristics of the products, if the amount of an ingredient of the jell-forming type is to be increased, the effect of so doing may be counterbalanced by decreasing the proportions of others of the same group or by increasing the proportion of the dispersing or dissolving agent used, and vice versa. Thus, if a jelly of high acid content is to be made, the proportion of pectic acid or pectate, or of sugar or of calcium or of several or all of them might be decreased, or that of the dispersing salts might be increased. Similarly, if the sugars are increased, the compensating changes of the ingredients may be made.

It is, of course, obvious from the foregoing that the proportions of ingredients may be varied to meet any desired need in sugar content, strength, resilience, clarity, grain and the like in jells.

Another advantage resulting from the use of the pectic bodies in accordance with my invention resides in the fact that jells may be formed without preliminary boiling as now required. Thus in accordance with my invention, the pectic acid of, for example, Formula 3 and/or the soluble pectate of, for example, Formula 2, may be mixed or dispersed in the desired amount of sugar and the mixture dissolved in the cold in about 50 parts by weight of water. The other ingredients of these formulae, either in the proportions given in the examples or in other suitable proportions, are then dissolved separately in the cold in about an equal amount of water. In each case, solution is readily effected in the cold. Upon the addition of one solution to the other in a mold or the like or the admixture of the two solutions in a common mold or receptacle, a jell having the characteristics set forth above results almost immediately from the combination.

I claim:

1. As a new article of manufacture, a low-sugar content jelly formed by the aid of an insoluble alkaline-earth metal pectate, a dispersing agent and a food acid.

2. A dry mix capable of forming a jelly after boiling in an aqueous medium comprising pectic acid, sodium carbonate, citric acid, calcium carbonate, ammonium citrate and potassium ammonium phosphate.

3. A dry mix capable of forming a jelly after boiling in an aqueous medium comprising ammonium pectate, calcium lactate, sodium citrate and citric acid.

4. A dry mix capable of forming a jelly after boiling in an aqueous medium comprising calcium pectate, sodium citrate, sodium hexametaphosphate and tartaric acid.

5. The method of preparing a jelly comprising mixing with an acid aqueous medium a composition comprising calcium pectate and a salt capable of dispersing the pectate and boiling the mixture.

6. The method of preparing a jelly comprising mixing with an aqueous medium a mixture of pectic acid, a compound capable of forming a water-soluble pectate with the pectic acid, a water-soluble calcium salt, a salt capable of dispersing a water-insoluble pectate and a food acid and boiling the mixture.

7. The method of preparing a jelly comprising mixing with an aqueous medium a composition comprising a water-soluble pectate, a water-soluble calcium salt, a salt capable of dispersing an insoluble pectate and a food acid and boiling the mixture.

8. The method of preparing a jelly comprising mixing with an aqueous medium a mixture comprising calcium pectate, a salt capable of dispersing the pectate and a food acid and boiling the mixture.

9. The method of preparing a jelly without boiling comprising dissolving pectic acid and a compound capable of reacting with pectic acid to form a water-soluble pectate in an aqueous medium, dissolving a soluble alkaline-earth salt, a salt capable of dispersing an insoluble pectate and a food acid in a second aqueous medium and mixing the solutions so formed to produce the jelly.

10. The method of preparing a jelly without boiling comprising dissolving a water-soluble pectate in an aqueous medium, dissolving a composition comprising calcium lactate, sodium citrate and citric acid in a second aqueous medium and mixing the solutions to produce the jelly.

11. A clear and resilient jelly capable of holding its shape under normal weather conditions, comprising a water-insoluble metal pectate, a salt capable of dispersing said pectate and a food acid.

12. A clear and resilient jelly capable of holding its shape under normal weather conditions, comprising calcium pectate, sodium citrate, sodium hexametaphosphate and tartaric acid.

13. The method of preparing a jelly capable of holding its shape under normal weather conditions comprising dispersing an insoluble metal pectate in an acid aqueous medium with a dispersing salt.

14. A clear and resilient acid jelly capable of holding its shape under normal weather conditions, comprising a dispersed alkaline earth metal pectate and a dispersing salt.

15. A clear and resilient acid jelly capable of holding its shape under normal weather conditions, comprising a dispersed calcium pectate and a dispersing salt.

16. A clear and resilient jelly capable of holding its shape under normal weather conditions, comprising calcium pectate, a dispersing agent and a food acid.

NATHAN M. MNOOKIN.